(12) United States Patent
Akolkar et al.

(10) Patent No.: US 9,020,840 B2
(45) Date of Patent: *Apr. 28, 2015

(54) SYSTEM AND METHOD FOR CUSTOM-FITTING SERVICES TO CONSUMER REQUIREMENTS

(71) Applicant: International Business Machines Corporation, Armonk, NY (US)

(72) Inventors: Rahul P. Akolkar, Tuckahoe, NY (US); Thomas E. Chefalas, Somers, NY (US); Jim A. Laredo, Katonah, NY (US); Anca Sailer, Scarsdale, NY (US); Frank A. Schaffa, Hartsdale, NY (US); Alla Segal, Mount Kisco, NY (US); Ignacio Silva-Lepe, Putnam Valley, NY (US); Chang-Shing Perng, Goldens Bridge, NY (US); Tao Tao, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 13/655,890

(22) Filed: Oct. 19, 2012

(65) Prior Publication Data

US 2014/0114805 A1   Apr. 24, 2014

(51) Int. Cl.
*G06Q 30/00*   (2012.01)
*G06F 17/30*   (2006.01)
(Continued)

(52) U.S. Cl.
CPC ...... *G06Q 30/0621* (2013.01); *G06F 17/30401* (2013.01); *G06F 17/30424* (2013.01); *G06F 17/3043* (2013.01); *G06F 17/30522* (2013.01); *G06F 17/30864* (2013.01);
(Continued)

(58) Field of Classification Search
CPC ............... G06F 17/00; G06F 17/30; G06F 17/30023–17/30047; G06F 17/3005; G06F 17/30091–17/30097; G06F 17/301–17/30112; G06F 17/30386–17/30389; G06F 17/30401; G06F 17/30304; G06F 17/30424–17/30427; G06F 17/3043; G06F 17/30436; G06F 17/30442–17/30554; G06Q 30/0601; G06Q 30/0613–30/0631; G06Q 30/0641; H04L 29/0809; H04L 67/02
USPC ............. 705/1.1, 26.1–27.2; 707/705–735
See application file for complete search history.

(56) References Cited

U.S. PATENT DOCUMENTS 7,340,416 B1 * 3/2008 Larabee et al. ............ 705/7.12
7,933,785 B2   4/2011 Mau
(Continued)

OTHER PUBLICATIONS

On the Foundations of Data Interoperability and Semantic Search on the Web. Hamid Haidarian Shahri, Doctor of Philosophy. University of Maryland, College Park. 2011.*
(Continued)

*Primary Examiner* — William Allen
(74) *Attorney, Agent, or Firm* — Louis J. Percello; Ryan, Mason & Lewis, LLP (57) ABSTRACT

Systems and methods for custom-fitting a service solution to consumer requirements are provided. A method for custom-fitting a service solution to consumer requirements, comprises acquiring a request for the service solution from a consumer via a conversational interface, and issuing a query to a service knowledge base to obtain a set of service knowledge representation items from the service knowledge base and analyzing each service knowledge representation item to determine whether a custom-fit service solution can be developed.

12 Claims, 4 Drawing Sheets

(51) Int. Cl.
*G06Q 30/06* (2012.01)
*H04L 29/08* (2006.01)

(52) U.S. Cl.
CPC ....... *G06Q 30/0611* (2013.01); *G06Q 30/0625* (2013.01); *H04L 29/0809* (2013.01); *H04L 67/02* (2013.01)

(56) References Cited

U.S. PATENT DOCUMENTS

| | | | |
|---|---|---|---|
| 8,521,725 B1* | 8/2013 | Pearson et al. | 707/722 |
| 2004/0019478 A1* | 1/2004 | Rucker et al. | 704/5 |
| 2007/0282700 A1 | 12/2007 | Masse | |
| 2009/0112735 A1 | 4/2009 | Viehmann et al. | |
| 2011/0138050 A1 | 6/2011 | Dawson et al. | |
| 2011/0145226 A1* | 6/2011 | Gollapudi et al. | 707/723 |
| 2012/0030241 A1* | 2/2012 | Lupoli et al. | 707/780 |
| 2012/0072455 A1* | 3/2012 | Jain et al. | 707/779 |
| 2013/0346381 A1* | 12/2013 | Ottolenghi | 707/706 |
| 2014/0297478 A1* | 10/2014 | Kalin | 705/26.62 |

OTHER PUBLICATIONS

"The DeepQA Project," http://www.research.ibm.com/deepqa/deepqa.shtml, 1 page.
S. Battle et al., "Semantic Web Services Language (SWSL)," http://www.w3.org/Submission/SWSF-SWSL/, Sep. 2005, 56 pages.
D. Berardi et al., "Automatic Service Composition Based on Behavioral Descriptions," International Journal of Cooperative Information Systems, 2005, pp. 333-376, vol. 14, No. 4, World Scientific Publishing Company.
R. Berbner et al., "Heuristics for QoS-Aware Web Service Composition," IEEE International Conference on Web Services (ICWS), Sep. 2006, pp. 72-82.
B. Blau et al., "How to Coordinate Value Generation in Service Networks—A Mechanism Design Approach," Business & Information Systems Engineering (BISE)—Research Paper, May 2009, pp. 343-356.
G. Dobson et al., "Positioning and Pricing a Product Line," Marketing Science, Summer 1988, pp. 107-125, vol. 7, No. 2, INFORMS.
Michael L. Katz, "Firm-Specific Differentiation and Competition Among Multiproduce Firms," The Journal of Business, Issues in Strategic Pricing, Jan. 1984, p. S149-S166, vol. 57, No. 1, Part 2, The University of Chicago Press.
S. Kona et al., "Web Service Discovery and Composition Using USDL," The 8th IEEE International Conference on E-Commerce Technology and the 3rd IEEE International Conference on Enterprise Computing, E-Commerce, and E-Services, Jun. 2006, 3 pages.
S. Lamparter et al., "Preference-Based Selection of Highly Configurable Web Services," ACM 16th International Conference on World Wide Web (WWW), May 2007, pp. 1013-1022.
Christine Legner, "Is There a Market for Web Services?," Science-Oriented Computing—ICSOC Workshops, 2007, pp. 29-42.
F. Lécué et al., "A Formal Model for Semantic Web Service Composition," The Semantic Web—ISWC, Lecture Notes in Computer Science, 2006, pp. 385-398, vol. 4273, Springer-Verlag.
K. Sridhar Moorthy, "Market Segmentation, Self-Selection, and Product Line Design," Marketing Science, Autumn 1984, pp. 288-307, vol. 3, No. 4, INFORMS.
M. Mussa et al., "Monopoly and Product Quality," Journal of Economic Theory, Aug. 1978, pp. 301-317, vol. 18, Academic Press, Inc.
D. Roman et al., "Web Service Modeling Ontology," Journal of Applied Ontology, Jan. 2005, pp. 77-106, vol. 1, No. 1, IOS Press.
A. Sailer et al., "Graph Based Cloud Service Placement," IEEE International Conference on Services Computing (SCC), Jul. 2010, pp. 89-96.
E. Sirin et al., "HTN Planning for Web Service Composition Using SHOP2," Journal of Web Semantics, Jun. 2004, pp. 377-396, vol. 1, No. 4, Elsevier Science.
L. Zeng et al., "QoS-Aware Middleware for Web Services Composition," IEEE Transactions on Software Engineering, May 2004, pp. 311-327, vol. 30, No. 5, IEEE Computer Society.

\* cited by examiner

SYSTEM AND METHOD FOR CUSTOM-FITTING SERVICES TO CONSUMER REQUIREMENTS

TECHNICAL FIELD

The field generally relates to systems and methods for custom-fitting a service solution to consumer requirements and, in particular, shifting the burden of discovery of and matching a service solution with business needs from the service consumer to the service marketplace.

BACKGROUND

For as long as there have been services, computational or otherwise, there has been a desire to have a convenient medium to expose and discover service offerings. Since the early days of distributed computing environment (DCE) and common object request broker architecture (CORBA), there have been directory servers and trading services, the latter being an attempt at mimicking a sort of yellow pages for distributed objects, the yellow pages being the archetypal medium for finding services by various criteria when a direct or symbolic reference to the service does not exist. More recently there have been efforts, such as Java naming and directory interface (JNDI) for Java remote objects, and universal description discovery and integration (UDDI) for web services, aimed at defining a standard approach for the exchange of computational services. At the same time, numerous commercial web services directories and registries have been created in an effort to capitalize on the potential of a services marketplace. Some web services intermediaries use relatively simplistic search and categorization algorithms despite the availability of more advanced features in specifications like UDDI.

Traditional services catalogs or registries, such as UDDI, are intended to store metadata for search oriented architecture (SOA) services retrieval. The Web Service Modeling Ontology (WSMO) is an effort to fill the semantic gap between different services metadata by adding semantic capabilities to the web services description which was initially based on a syntactic interchange approach only. Thus, WSMO, web ontology language-s (OWL-S) and other semantic web services based frameworks and languages attempt to alleviate the search and composition of services.

Other marketplace service matching approaches rely on artificial intelligence (AI) planning algorithms and apply backward chaining to derive suitable matching and composition from a certain goal. Often such approaches leverage formal descriptions of service functionality as proposed by the World Wide Web Consortium (W3C), OWL-S or WSMO. Compositions that also consider information about the (temporal) behavior of a service and quality of service (QoS) based matching and composition algorithms have also been proposed.

SUMMARY

In general, exemplary embodiments of the invention include systems and methods for custom-fitting a service solution to consumer requirements and, in particular, shifting the burden of discovery of and matching a service solution with business needs from the service consumer to the service marketplace.

In an exemplary embodiment of the invention, a system for custom-fitting a service solution to consumer requirements, comprises a service consumer module including a conversational interface interacting with a consumer to acquire a request for the service solution, and a service specification mining module, and a services marketplace module including a service knowledge base having a collection of service knowledge representation items, wherein the service specification mining module interacts with the conversational interface and the service knowledge base, and wherein the service specification mining module issues a query to the service knowledge base to obtain a set of the service knowledge representation items and analyzes each service knowledge representation item to determine whether a custom-fit service solution can be developed.

The service specification mining module may maintains a conversational state on a per service consumer basis.

A service knowledge representation item may be machine-processable content obtained from a service characterization, and may include one or more parameters. The machine-processable content may be at least one of semantic and syntactic. Each of the one or more parameters is one of a pluggable parameter fulfilled by plugging in another service knowledge representation item or a user parameter fulfilled by user input. The service characterization may be at least one of a service description, a service interface, service documentation and service implementation code.

The conversational interface may compute the query to be issued to the service knowledge base based on the request for the service solution, and forward the query to the service specification mining module.

The service specification mining module may analyze each service knowledge representation item in its conversational state.

The service specification mining module may synthesize the custom-fit service solution and transmit the custom-fit service solution to the conversational interface if the service specification mining module determines that the custom-fit service solution can be developed. The synthesized custom-fit service solution may not exist as a service knowledge representation item in the service knowledge base. The service specification mining module may synthesize the custom-fit service solution from service knowledge representation items s1, s2, s3, . . . , sn by plugging s2, s3, . . . , sn into s1, where n≥2.

If the service specification mining module determines that the custom-fit service solution cannot be developed, the service specification mining module may select a subset of user parameters from the set of the service knowledge representation items and pass the subset of user parameters to the conversational interface. The conversational interface may compute a question based on the user parameters and the question may be provided to the consumer. Upon receipt of an answer to the question from the consumer, the conversational interface may compute another query to be issued to the service knowledge base, and forward the other query to the service specification mining module.

The service specification mining module may transmit the custom-fit service solution to the conversational interface if the service specification mining module finds the custom-fit service solution.

The service specification mining module may determine that a parameter in a service knowledge representation item of the set of the service knowledge representation items is unpluggable.

The service specification mining module may compute another query to be issued to the service knowledge base based on a pluggable parameter in the set of service knowledge representation items, wherein the pluggable parameter has not been deemed unpluggable, and the service specification mining module marks the pluggable parameter as queried.

The service specification mining module may determine that the request cannot be fulfilled automatically if every service knowledge representation item of the set of the service knowledge representation items includes only unpluggable parameters. The service specification mining module may engage a human consultant if the service specification mining module determines that the request cannot be filled automatically.

In an exemplary embodiment of the invention, a method for custom-fitting a service solution to consumer requirements, comprises acquiring a request for the service solution from a consumer via a conversational interface, and issuing a query to a service knowledge base to obtain a set of service knowledge representation items from the service knowledge base and analyzing each service knowledge representation item to determine whether a custom-fit service solution can be developed.

The method may further comprise computing the query to be issued to the service knowledge base based on the request for the service solution, and forwarding the query to a service specification mining module.

The method may further comprise determining that the custom-fit service solution cannot be developed, selecting a subset of user parameters from the set of the service knowledge representation items, passing the subset of user parameters to the conversational interface, and computing a question based on the user parameters and providing the question to the consumer.

Upon receipt of an answer to the question from the consumer, the method may further comprise computing another query to be issued to the service knowledge base, and forwarding the other query to a service specification mining module.

The method may further comprise computing another query to be issued to the service knowledge base based on a pluggable parameter in the set of service knowledge representation items, wherein the pluggable parameter has not been deemed unpluggable, and marking the pluggable parameter as queried.

The method may further comprise determining that the request cannot be fulfilled automatically if every service knowledge representation item of the set of the service knowledge representation items includes only unpluggable parameters, and engaging a human consultant if the request cannot be fulfilled automatically.

In an exemplary embodiment of the present invention, an article of manufacture comprises a computer readable storage medium comprising program code tangibly embodied thereon, which when executed by a computer, performs method steps for custom-fitting a service solution to consumer requirements, and the method steps comprise acquiring a request for the service solution from a consumer via a conversational interface, issuing a query to a service knowledge base to obtain a set of service knowledge representation items from the service knowledge base and analyzing each service knowledge representation item to determine whether a custom-fit service solution can be developed, computing the query to be issued to the service knowledge base based on the request for the service solution, and forwarding the query to a service specification mining module, wherein the service specification mining module synthesizes the custom-fit service solution and transmits the custom-fit service solution to the conversational interface if the service specification mining module determines that the custom-fit service solution can be developed.

In an exemplary embodiment of the present invention, an apparatus for custom-fitting a service solution to consumer requirements, comprises a memory, and a processor coupled to the memory and configured to execute code stored in the memory for acquiring a request for the service solution from a consumer via a conversational interface, and issuing a query to a service knowledge base to obtain a set of service knowledge representation items from the service knowledge base and analyzing each service knowledge representation item to determine whether a custom-fit service solution can be developed.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for custom-fitting a service solution to consumer requirements and, in particular, shifting the burden of discovery of and matching a service solution with business needs from the service consumer to the service marketplace. This invention may, however, be embodied in many different forms and should not be construed as limited to the embodiments set forth herein.

Marketplaces can be defined as places where third parties bring their goods for consumers to find them and transact in some convenient way. Typically, marketplace service matching approaches support matching and composition using service functionality criteria only and disregard other non-functional (e.g., business-related) service properties used for service differentiation (e.g. quality of service or prices). These approaches do not support declarative representation for service descriptions and queries as required for service retrieval.

An approach for a compact representation of service descriptions and queries with complex pricing and preference functions may support multiple service configurations and feature a service selection algorithm, but is restricted to the selection of single services and not applicable for service composition. Typically, the presence of asymmetric information and rational opportunistic behavior of service providers and customers is always ignored in the body of work that deals with service composition from a purely technical perspective.

In the economics and marketing science literature, prior contributions typically focus on the trade-off between extra marketplace coverage and lost revenue, building on the rational opportunistic behavior of service providers and customers. They differ with respect to the customer segments considered and the number of service versions.

By design, cloud service products are characterized by an inherent product complexity. Hence, the description of the cloud service and the cloud service customer preferences are preferably driven by a combination of functional and non-functional attributes. In the economic literature, typically, a cloud service utility is modeled as linear multi-attributive utility functions over non-functional quality attributes which yield a user's willingness to select and pay for the product and can lay the basis for price negotiation.

In the cloud services space, third party services providers can bring their cloud services, and services that consumers expect, to match the capabilities that best suit the consumer's needs with a service offering. Services as opposed to goods can vary in the way they function, in the way that they get activated, and vary in the way they serve the requirements they fulfill. In general, according to embodiments of the present invention, there is provided systems and methods for allowing the consumer to find a services solution tailored to their needs. Embodiments of the invention can be applied in the landscape of cloud services marketplaces, and describe an architecture, and the enablers that would help consumers engage with the marketplace in an easy to use and successful manner.

Classification schemes that reflect the vocabulary of the target customers can be used for the discovery of suitable Web services. According to embodiments of the present invention, a services marketplace can fulfill the promise of an electronic emporium where third party service providers are able to offer their services in a ubiquitous ecosystem, and where service consumers are able to acquire service solutions that are tailored to their requirements. Electronic commerce sites, for example, Amazon.com, allow (1) buyers looking for a wide variety of products and the ability to compare and contrast products from a wide variety of sellers, and (2) sellers to have direct access to catalogs and to use brand name, one-stop shopping and reputation systems to target a buyer base that they might not otherwise have access to. Similarly, a services marketplace in accordance with embodiments of the present invention (a) provides consumers with service solutions that are custom-fit to their requirements, with the system implicitly selecting from a variety of service offerings, and (b) enables providers to offer their services via an intelligent service store that has deep knowledge of services and consumers, and that is able to respond to consumer requests and learn from its experience.

In accordance with embodiments of the present invention, requirements do not need to be stated in terms of service offering features or the a priori existence of an off-the-shelf solution, the system will be able to compose a solution. In addition, service consumers can utilize the social nature of the marketplace to rate and recommend services and providers, and let the marketplace use other consumers' ratings and recommendations factor into the fulfillment of a service requirement. To a service provider, in accordance with embodiments of the present invention, a services marketplace is not only a means to expose service offerings, its existing content and features are also a means to enrich new offerings via, for example, custom adaptation and incorporation of such customizations back into the service store. The social nature of the marketplace can allow providers to reach an otherwise not available service consumer base, and to benefit from the competition and collaboration with other providers.

Services can be classified as, for example, standalone services that enhance offerings, and platforms that have evolved into ecosystems. Platforms may offer full life-cycle processes for their data artifacts, and as a result become the system of record for those key artifacts. These elements may build an ecosystem that keeps participants engaged. Platforms can be in essence marketplaces where a consumer can come and pay for the base services and then get add-ons that enhance the value of those base services.

According to embodiments of the present invention, a number of enablers, for example, from a services consumer point of view, can be brought together under one or more architectures to create the services marketplaces. A subset of these enablers can be, for example, consumability and intelligence.

A. Consumability

In accordance with embodiments of the present invention, methods for applying, adapting or composing service solutions to fulfill business needs will be available even if a service consumer's needs are expressed in general or vague terms that are not directly translated into the corresponding service solution. For example, under conventional system, when a service consumer states a "need for a payroll service solution", the fact that a particular realization of, for example, an ADP solution, may fit the consumer's needs is not necessarily apparent.

Conventional approaches to customizing a service solution can be limited by how well the marketplace can understand the consumer's requirements, what it knows about the solution, how well it can correlate the two, and how it can adapt the solution to fit the consumer's needs. For instance, understanding a need for a payroll service solution can amount to checking off a multiple choice box. However, when the number of choices grows beyond the grasp of the consumer, or when presenting each choice cannot be reasonably done with a few words, alternatives to the familiar form-based and menu-based interfaces are needed. Similarly, narrowing down possible solutions can amount to presenting structured query language (SQL) query results in a table, which the consumer would try to understand and select from. Alternatively, the marketplace could present the consumer with the next level of choices based on its understanding of results to service knowledge queries.

In order to improve the consumability of service use exemplary embodiments of the present invention go beyond traditional approaches. In particular, in accordance with embodiments of the present invention, consumers can express their needs and requirements in a flexible manner. In addition, the marketplace is able to understand a consumer's request in multiple modalities (including, but not limited to, natural language requests). As a result, in accordance with embodiments of the present invention, vague or ambiguous requests are transformed into service knowledge queries and their results. Further, conversations with the consumer are had to further elucidate details of the consumer's requirements. As a result, the burden of discovery of and matching a service solution with business needs is shifted from the service consumer to the service marketplace by using a rich enough knowledge base of service solutions, and the capability to custom-fit a service solution based on consumer-centric requirements. As a result, a service consumer can focus on its requirements instead of bearing the burden of discovery and matching.

According to embodiments of the present invention, consumers may regard the marketplace as custom-fitting a service solution to their needs. The marketplace is able to not only determine a candidate service solution, but is also able customize such a solution to fit the consumer's needs, for example, by composing more than one candidate's solutions. For example, after a consumer states a need for a payroll service solution, the marketplace is able to determine that a plurality of candidate solutions may apply. However, the solutions may vary depending on the size of the business and whether payroll data could be maintained in the cloud or the data needs to stay on the premises. According to embodiments of the present invention, after engaging in a conversation with the consumer, the marketplace can determine a more precise solution to fit the consumer's needs. For example, if payroll data need to be maintained on premise and a third party solution could be used, the marketplace could also perform an adaptation of ADP (e.g., a semi-automated adaptation) with, for example, a SAP solution, providing an instance of the composition, and return a uniform resource locator (URL) for the consumer to start using the service.

B. Intelligence

A system that attempts to custom-fit a service solution to a consumer's business needs is dependent on its solution repository, its deep question answering (DeepQA) ability and its ability to internalize its previous experience. DeepQA relates to a computer system performing open-domain question answering and a systems ability to deliver precise, meaningful responses, and synthesize, integrate, and rapidly reason over the breadth of human knowledge as it is most rapidly and naturally produced, in natural language text. DeepQA relates to the accessibility of natural language content and the integration and advancement of Natural Language Processing (NLP), Information Retrieval, Machine Learning, Knowledge Representation and Reasoning, and parallel computation that drives open-domain automatic question answering technology.

A system's solution repository, DeepQA ability and ability to internalize its previous experience are referred to as the intelligence of a services marketplace. These features can also be relevant to a service provider, who may be interested in incorporating service knowledge from service characterizations.

Service descriptions for directories for web services that go beyond those found in conventional marketplaces allow service consumers to discover and use suitable service offerings. In particular, in accordance with embodiments of the present invention, such descriptions include more sophisticated classification schemes that reflect the vocabulary of the target service consumer.

Service repository products may incorporate semantic metadata into service descriptions. For example, a conventional service repository product may load and parse web ontology language (OWL) files, but does not exploit any of the richer semantics of the OWL language. Instead, the taxonomy part of the OWL file (e.g., the owl:Class and rdfs: subClassOf elements) is made available to classify artifacts in a service repository product, which can be referred to as a classification system.

In accordance with embodiments of the present invention, an intelligent services marketplace includes more, for example, orders of magnitude more, service offerings than existing web service marketplaces, and has more information about those service offerings. The intelligent services marketplace includes service offerings in various domains, such as, for example, insurance, payroll, health care, accounting, etc., and includes variations of the service offerings, such as, for example, a payroll service customized to fit payroll data on-premise and another one using an ad-hoc payroll data format. In accordance with embodiments of the present invention, an intelligent services marketplace includes simple service offerings, such as, for example, a stock quote service, and composite service offerings, such as, for example, a financial services application, that includes a stock quote service as well as a trading service. In connection with the information about the service offerings, the intelligent services marketplace is informed about the service offerings' service interfaces, and, for example, has semantic knowledge about what the service does, its application domain, and its points of variability.

In accordance with embodiments of the present invention, an intelligent services marketplace is also able to perform DeepQA over a vast knowledge base of service offering metadata, including syntactic and semantic knowledge. For example, the intelligent services marketplace is able to complement classic knowledge-based approaches with recent advances in NLP, Information Retrieval, and Machine Learning to interpret and reason over large volumes of service offering metadata to find precise results (as opposed to unmanageable numbers of hits that a traditional search engine might return) with reasonably accurate confidence (as opposed to the logical proof of correctness that a classic QA system might attempt).

In accordance with an embodiment of the present invention, in a cloud services marketplace, there is defined a high-level architecture that brings together the enablers enumerated into functional modules that (1) support service providers and consumers, and (2) embody a marketplace platform and cloud abstraction layer.

Figure 1:
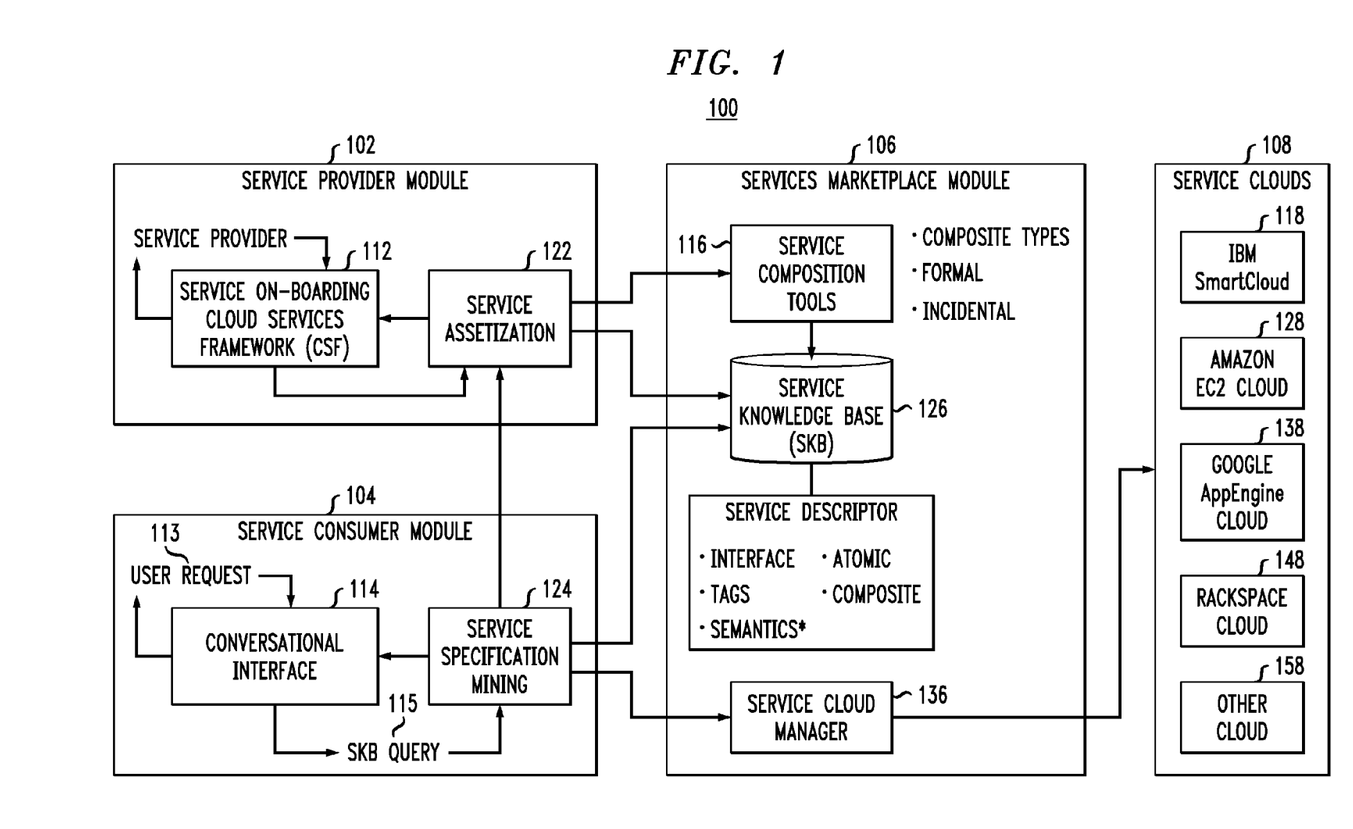
FIG. 1 is a high-level diagram of a system for custom-fitting a service solution to consumer requirements according to an exemplary embodiment of the invention.

FIG. 1 is a high-level diagram of a system for custom-fitting a services solution to consumer requirements according to an exemplary embodiment of the invention. Referring to FIG. 1, according to an embodiment of the present invention, the system 100 includes a service provider module 102, a service consumer module 104, a services marketplace module 106 and service clouds 108. The service provider module 102 includes a service on-boarding cloud services framework (CSF) 112 interacting with a service provider and a service assetization module 122. The service consumer module 104 includes a conversational interface 114 interacting with a user or consumer, and a service specification mining module 124. The services marketplace module 106 includes a service composition tools module 116, a service knowledge base (SKB) 126 and a service cloud manager 136 which interacts with the service clouds 108. The service clouds can be, for example, any service clouds, such as, the IBM SmartCloud 118, AMAZON EC2 cloud 128, GOGGLE AppEngine cloud 138, RACKSPACE cloud 148, and/or some other cloud 158.

The services marketplace module 106 serves as the main platform for the services marketplace. The services marketplace module 106 contains various kinds of metadata in the SKB 126, as well as a number of marketplace support services, including service composition tools 116 and a service cloud manager 136.

The SKB 126 can be referred to as a service store, or service knowledge network, and is a main repository of knowledge that is obtained from any characterization of a service. Service knowledge comprises both features inherent to a service as well as cross-service relationships. The SKB 126 includes a collection of service knowledge representation items encoded using various types of machine-processable representations, semantic as well as syntactic, in any format or machine language that is obtained from any service characterization, and, according to an embodiment, each representation type having its own processing agent. A service characterization is anything that describes, documents or otherwise elucidates what a service is about, including but not limited to a service description, a service interface, service documentation, and/or service implementation code.

The SKB 126 includes one or more parameters, each parameter being, for example, a pluggable parameter that can be fulfilled by plugging in some other service knowledge representation item, or a user parameter that needs to be fulfilled by user input. A pluggable parameter is not a user parameter. A pluggable parameter can be, for example, a variable in a program that the program itself can set to a value that it finds, as opposed to asking the user for a value for that variable. For example, the SKB 126 may include service definitions that the SKB finds that become a value for a particular parameter. If a parameter is pluggable, the system is able to assign the found service definition to that pluggable parameter. A user parameter is one that the system does not know how to fill in, whereby the recourse is to ask the user for a value for that user parameter.

The SKB 126 also contains background knowledge about context in which services operate and provides various levels of query and update interfaces, and maintains knowledge about consumers and providers in one or more social networks.

In accordance with an embodiment of the present invention, two functions of the service consumer module 104, in support of service consumers, are to provide a conversational interface 114 to consumers and to perform service specification mining based on service knowledge queries.

Given a request from a consumer/user (in, for example, modalities such as natural language, but not excluding generated choices), the conversational interface 114 engages in a conversation with the consumer. The conversational interface 114 generates a service knowledge query 115 from the initial request 113 that it forwards downstream for processing. This processing may yield choices for the user to make in order to narrow down the customization process, which the conversational interface 114 uses to generate questions for the consumer. According to an embodiment, where the conversational interface 114 acquires a service consumer request 113 for a service solution, the consumer pushes the request 113 to the conversational interface 114. Alternatively, the conversational interface 114 pulls the request 113 from the consumer.

Figure 2:
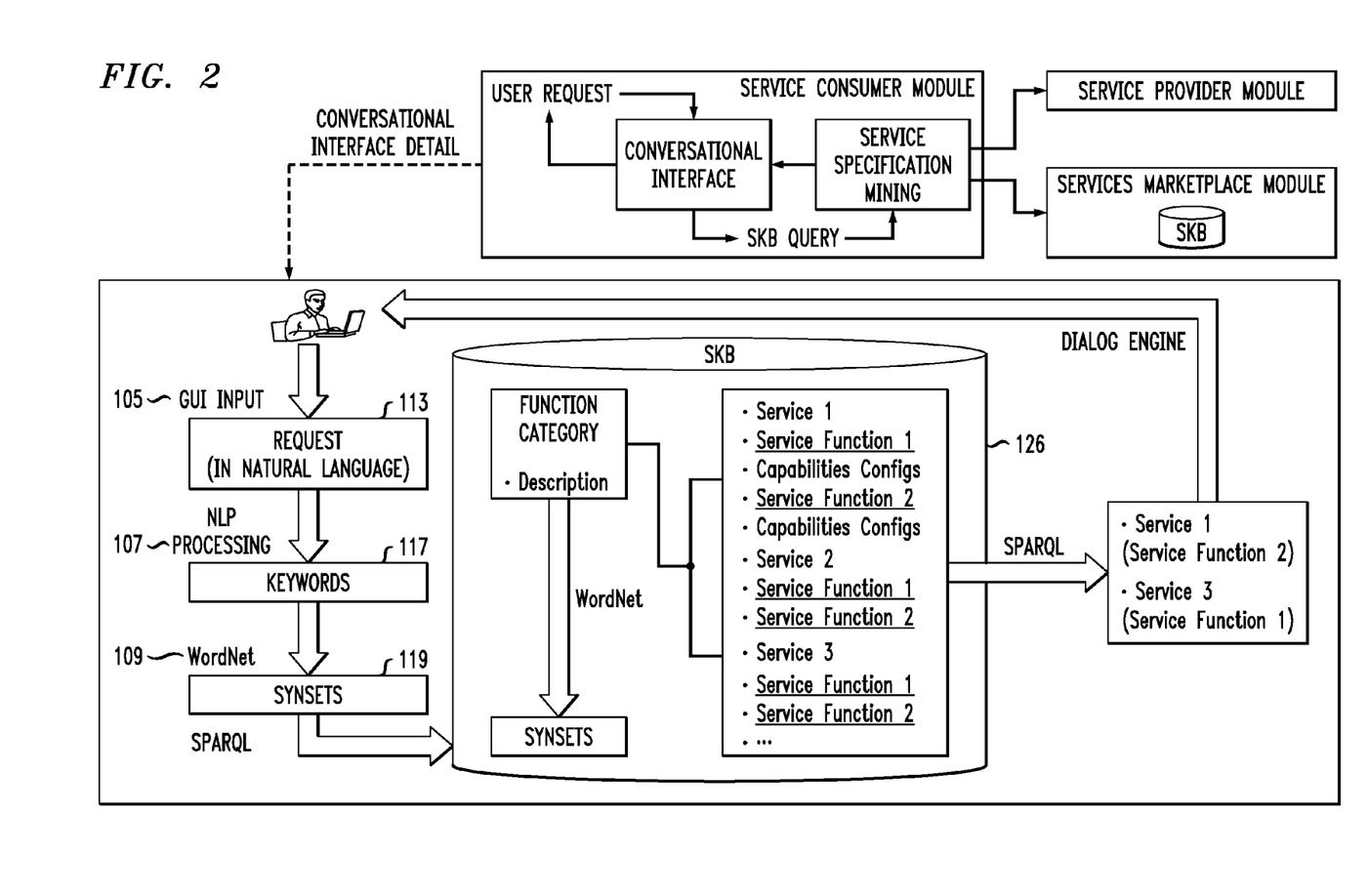
FIG. 2 is high-level diagram showing detail of a conversational interface of a system for custom-fitting a service solution to consumer requirements according to an exemplary embodiment of the invention.

FIG. 2 is high-level diagram showing detail of a conversational interface 114 of a system for custom-fitting a service solution to consumer requirements according to an exemplary embodiment of the invention. Referring to FIG. 2, in order to generate a query 115, a consumer makes a request 113, for example, in natural language, through a GUI input 105, for example, in natural language, which can be analyzed into keywords 117, using, for example, natural language processing 107. These keywords 117 can be used to create SPARQL Protocol and RDF Query Language (SPARQL) queries to look for service functions defined in the SKB 126. In addition, to improve the ability to find a matching service function, words that are related to the consumer's keywords 117 may also be used to create additional SPARQL queries. Specifically, given a dictionary such as WordNet 109, derivative forms of a keyword 117, such as hypernyms, hyponyms, holonyms and meronyms could be used to create synonym rings or Synsets 119. For instance, the word payroll may be taken from a consumer's request such as "need for payroll service solution". Corresponding derivative forms of "payroll" can include register (hypernym), and register, pay, earnings and salary (meronyms). If a service function has been annotated with one of these words, generating queries from all of the words will allow finding such service functions.

A task of the service specification mining module 124 is to mine the SKB 126 for service solutions based on input service knowledge queries 115. Once a result set is obtained, the result set is processed with the goal of zeroing in on one or more solutions for the consumer. In order to do this, the elements of the result are analyzed to determine criteria on which to continue asking questions. As this iterative process is performed, the service specification mining module 124 also maintains a conversation state as questions to a consumer are asked and answered. According to an embodiment, the conversational state is maintained on a per service consumer basis.

Figure 3:
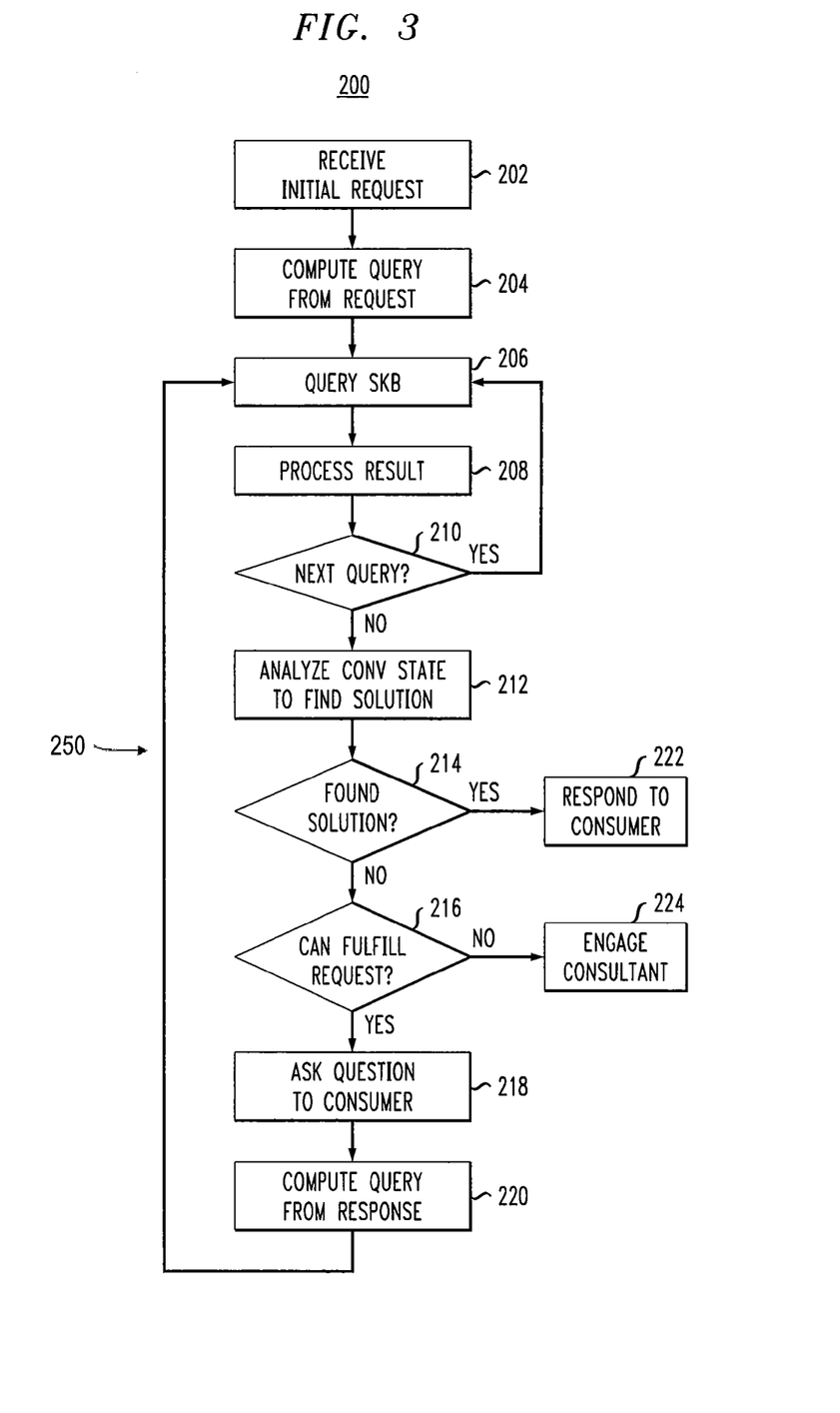
FIG. 3 is flow diagram of a method for custom-fitting a service solution to consumer requirements according to an exemplary embodiment of the invention.

FIG. 3 is flow diagram of a method 200 for custom-fitting a service solution to consumer requirements according to an exemplary embodiment of the invention. Referring to FIG. 3, the method 200 includes a feedback loop 250 (including steps 206, 208, 210, 212, 214, 216, 218 and 220), which illustrates the interaction between the conversational interface 114 and the service specification mining module 124. At step 202, an initial request for a service solution (for example, request 113 previously described in connection with FIGS. 1 and 2) is made by a consumer, and at step 204, a query (for example, query 115 previously described in connection with FIGS. 1 and 2) is computed from the request. The query 115 is sent to the service specification mining module 124, which then forwards the query to the SKB 126 in step 206. In response, the service specification mining module obtains a set of service knowledge representation items as a result, which is processed at step 208. Processing the result by the service specification mining module 124 includes, for example, on receipt of the result set, the service specification mining module incorporating each service knowledge representation item in the result set into the current conversational state. According to an embodiment, the service specification mining module 124 determines that a parameter in a service knowledge representation item in the current conversational state is unpluggable if the parameter is (1) pluggable; (2) is not bound to a result in the result set; and (3) has already been marked as queried. It is to be understood that the terms pluggable and unpluggable are not exclusive. In other words, a pluggable parameter (i.e., not a user parameter) can be deemed unpluggable if the system is not able to find a value that it can set to the parameter. So, a system may determine that a particular parameter is pluggable by being capable of being set to a value that the system finds, but also deem that parameter unpluggable if, for example, the system is not able to find the value.

The service specification mining module 124 determines at decision block 210, whether a next query is to be issued. If yes, the service specification mining module 124 computes a new query to be issued on the SKB 126, based on any pluggable parameter in any of the service knowledge representation items in the current conversational state, wherein any such parameter has not been deemed unpluggable. The service specification mining module 124 then marks the pluggable parameter used to generate the new query as queried. If there is no next query, at block 212, the service specification mining module analyzes the conversational state to find a solution. The service specification mining module 124 analyzes each service knowledge representation item in its conversational state in order to determine whether or not a custom-fit service solution can be developed. According to an embodiment, there may be one or a configurably small number of service knowledge representation items in the current conversational state, each one of said items having no unbound parameters.

According to an embodiment, if the service specification mining module 124 determines that a service solution can be arrived at, the service specification mining module 124 synthesizes a custom-fit service solution from its conversational state. Therefore, in this case, at decision block 214, the answer is yes, and the service specification mining module 124 returns the solution to the conversational interface 114 to respond to the consumer at block 222. The synthesized service solution may or may not exist as a service knowledge representation item in the SKB 126. According to an embodiment, where the service specification mining module 124 synthesizes a custom-fit service solution from its conversational state, the service specification mining module 124 composes the solution from service knowledge representation items $s_1, s_2, s_3, \ldots, s_n$ in its conversational state by plugging $s_2, s_3, \ldots, s_n$ into $s_1$, where $n \geq 2$.

According to an embodiment, if the service specification mining module 124 determines that a service solution cannot be found at block 214, then the service specification mining module 124 queries whether the service request can be fulfilled automatically at block 216. If it is determined that a request cannot be fulfilled automatically, the service specification mining module 124 engages a human consultant to continue the procedure at block 224. For example, if every service knowledge representation item in the current conversational state includes only unpluggable parameters, the service specification mining module 124 determines that the service request cannot be filled automatically, and a consultant is engaged as per block 224.

Alternatively, if the system is able to find values for the pluggable parameters so that the parameters are not deemed unpluggable, it can be determined that a request can be fulfilled automatically (e.g., "yes" at block 216), and the service specification mining module 124 selects a subset of user parameters from the service knowledge representation items in the current conversational state and passes them to the conversational interface 114. The conversational interface 114 computes a question based on the user parameters, and presents the question to the consumer at block 218.

On receipt of a consumer's answer, the conversational interface 114 computes a new query to be issued on the SKB 126 at block 220, and forwards the new query to the service specification mining module 124, thereby restarting the process at block 206.

An architectural property of a cloud services marketplace, according to an embodiment of the present invention, is the feedback loop that allows for new service compositions to be assetized and for these assets to contribute back to the service knowledge base, thus enabling the evolution of the service knowledge base and making subsequent comparable cloud solution delivery easier. Referring to FIG. 1, for example, according to an embodiment, the service specification mining module 124 provides new service compositions to the service assetization module 122 to assetize the new service compositions, which are then provided to the SKB 126.

According to an embodiment of the present invention, another architectural property is the ease with which the marketplace enables stakeholders to change roles. As a result of embodiments of the present invention, it is simpler for an average service provider or developer to be a service consumer of other services within the marketplace. In addition, by virtue of the conversational interface 114 and provided service composition tools 116, a cloud services marketplace according to an embodiment of the present invention also enables the average service consumer to become a service provider by assetizing and contributing a custom-fit, composed services solution that may solve a recurring need, into the marketplace.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1, 2 and 3 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 4:
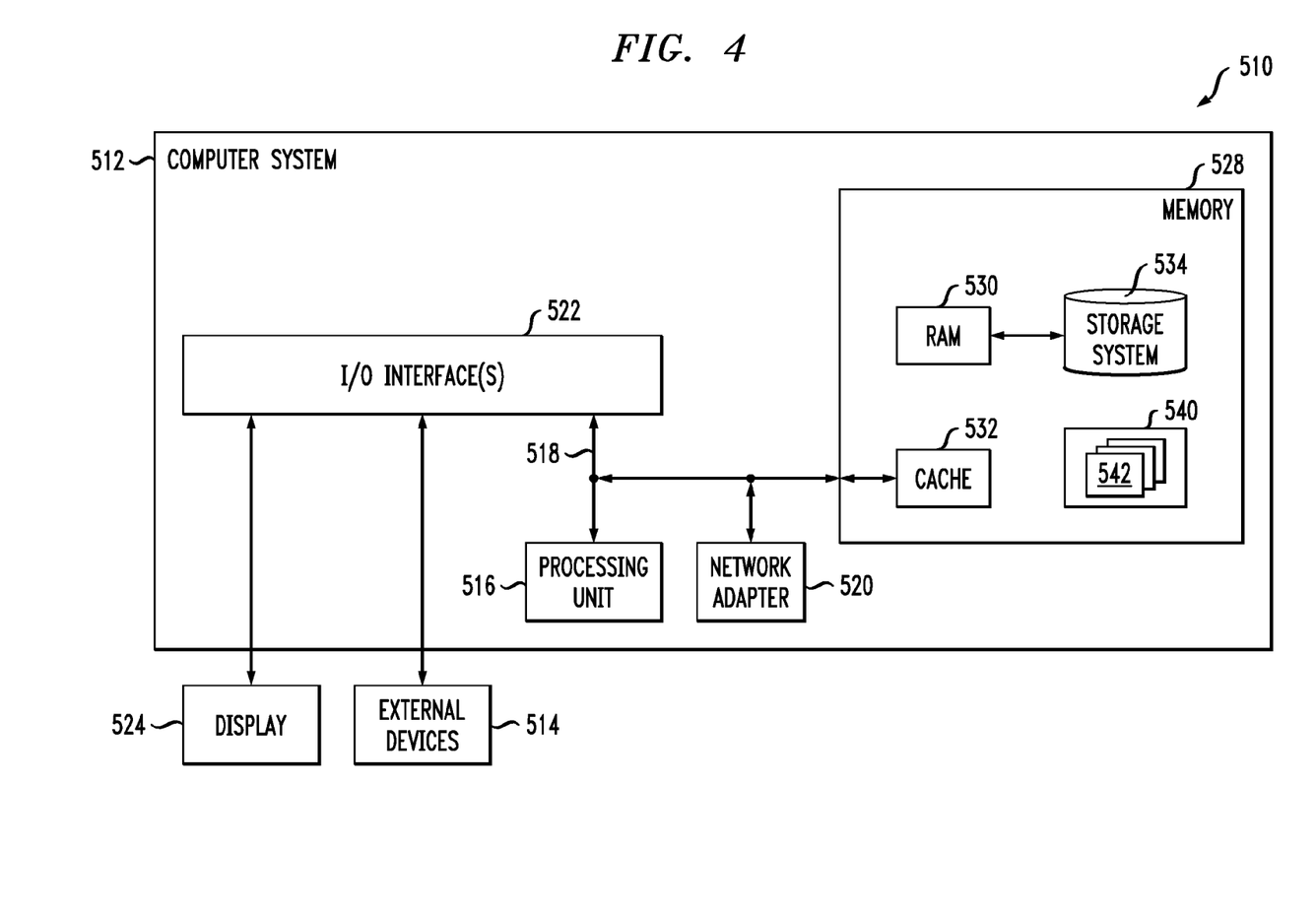
FIG. 4 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 4, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Embodiments of the present invention target general IT cloud services, which need a more comprehensive service descriptor than the existing web services (e.g., booking airline tickets) work handles, and cover a broader definition of API, for example, going beyond simple object access protocol (SOAP) into representational state transfer (REST) and distributed component object model (DCOM).

Embodiments of the present invention provide custom-fit service solutions for consumers, add a new layer of custom-fit service solutions to the integration as a service (IaaS), platform as a service (PaaS) and software as a service (SaaS) clouds, allow providers to retail and differentiate their services, and provide for warehousing and a deep understanding of large amounts of service knowledge. In addition, embodiments of the present invention enable social networking of consumers and providers, and provide economics and operational capabilities that allow for price negotiation and differentiation. Embodiments of the present invention can use a relatively small number of enabling technologies to realize the desired results, and to provide a starting point onto which additional enabling technologies can be integrated in the future.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method for custom-fitting a service solution to consumer requirements, comprising:
   acquiring a request for the service solution from a consumer via a conversational interface executed on a processor;
   issuing a query to a service knowledge base to obtain a set of service knowledge representation items from the service knowledge base;
   obtaining the set of service knowledge representation items from the service knowledge base;
   analyzing each service knowledge representation item to determine whether a custom-fit service solution can be developed;
   determining that a custom-fit service solution can be developed;
   computing, by the conversational interface executed on the processor, the query to be issued to the service knowledge base based on the request for the service solution, and forwarding the query to a service specification mining module, wherein the service specification mining module synthesizes the custom-fit service solution and transmits the custom-fit service solution to the conversational interface;
   assetizing the custom-fit service solution, wherein the custom-fit service solution is added to the service knowledge base; and
   determining that the request cannot be fulfilled automatically by concluding that each parameter of every service knowledge representation item of the set of the service knowledge representation items is an unpluggable parameter.

2. The method of claim 1, wherein the service specification mining module analyzes each service knowledge representation item in its conversational state.

3. The method of claim 1, wherein the synthesized custom-fit service solution does not exist as a service knowledge representation item in the service knowledge base.

4. The method of claim 1, wherein the service specification mining module synthesizes the custom-fit service solution from service knowledge representation items $s_1, s_2, s_3, \ldots, s_n$ by plugging $s_2, s_3, \ldots, s_n$ into $s_1$, where $n > 2$.

5. The method of claim 1, further comprising:
   determining that a custom-fit service solution cannot be developed;
   selecting a subset of user parameters from the set of the service knowledge representation items; and
   passing the subset of user parameters to the conversational interface.

6. The method of claim 5, further comprising computing a question based on the user parameters and providing the question to the consumer.

7. The method of claim 6, wherein upon receipt of an answer to the question from the consumer, the method further comprising computing another query to be issued to the service knowledge base, and forwarding the other query to a service specification mining module.

8. The method of claim 1, further comprising computing another query to be issued to the service knowledge base based on a pluggable parameter in the set of service knowledge representation items, wherein the pluggable parameter has not been deemed unpluggable, and marking the pluggable parameter as queried.

9. The method of claim 1, further comprising engaging a human consultant based upon determining that the request cannot be filled automatically.

10. The method of claim 1, wherein a service knowledge representation item is machine-processable content obtained from a service characterization.

11. The method of claim 10, wherein the machine-processable content is at least one of semantic and syntactic.

12. The method of claim 1, wherein each parameter of every service knowledge representation item is one of a pluggable parameter fulfilled by plugging in a service knowledge representation item or a user parameter fulfilled by user input.

* * * * *